Figures 1, 2:
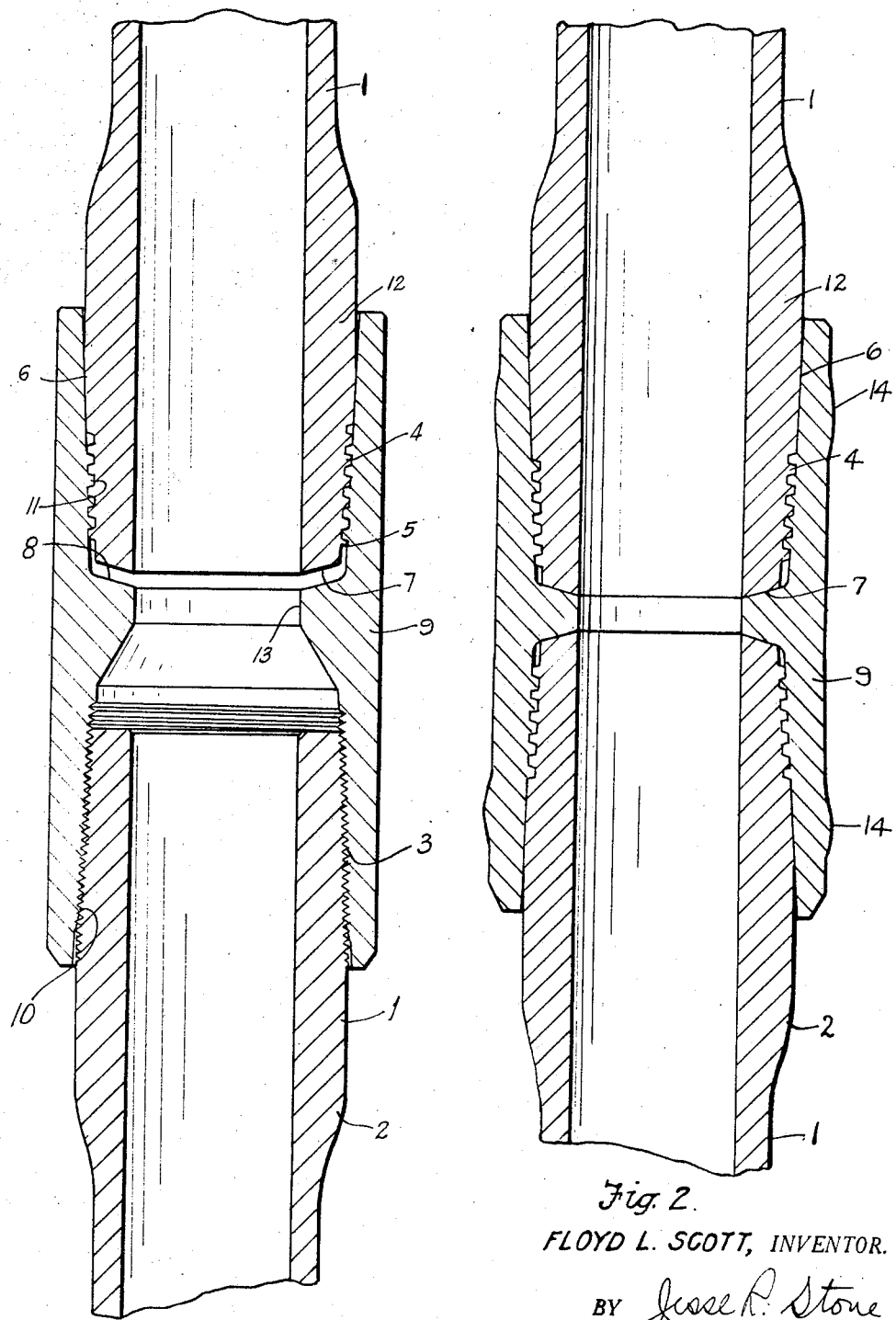

July 5, 1938.  F. L. SCOTT  2,122,757
DRILL STEM COUPLING
Filed July 5, 1935

FLOYD L. SCOTT, INVENTOR.

BY Jesse R. Stone
ATTORNEY

Patented July 5, 1938

2,122,757

UNITED STATES PATENT OFFICE 2,122,757

DRILL STEM COUPLING

Floyd L. Scott, Houston, Tex., assignor to Hughes Tool Company, Houston, Tex., a corporation of Texas Application July 5, 1935, Serial No. 29,771

5 Claims. (Cl. 285—146)

My invention relates to tool joints employed in connecting together adjacent ends of sections of a drill stem employed in communicating a rotative movement to a well drill.

I aim to provide a one piece tool joint, one end of which is threaded to be secured more or less permanently to a pipe section and the other end of which is threaded with a coarse heavy thread to engage with a mating pin member formed upon the end of another drill stem section.

It is an object to so construct the mating ends of the coupling and the pin member as to form a secure seal at the joint and also to provide a thread to hold the pin and box together, the structure being designed so that it will wear for long periods of time.

I do not rely upon the threads to maintain the seal, but rather upon unthreaded areas at both ends of the threaded portion.

The invention resides particularly in the arrangement of the sealing surfaces of the joint.

In the drawing herewith, Fig. 1 is a central longitudinal section through a tool joint constructed according to my invention.

Fig. 2 is a similar view showing the joint fully screwed up, and with both ends of the coupling coarsely threaded.

The drill stem sections 1 are formed with an upset 2 at each end whereby the wall of the pipe is thickened. One end of the pipe section is formed with a tapered end area which may be threaded with a comparatively fine thread 3, or with a coarse thread as seen in Fig. 2.

The other end of the pipe section is also tapered and has thereon a relatively coarse flat-topped thread 4. The threaded portion begins at a point spaced slightly from the end at 5 and extends inwardly from the end for approximately one half of the tapered area. Beyond the threaded portion is a smooth unthreaded area 6 which is a sealing area.

At the end of the pipe section the end surface is beveled at 7 to engage a sealing shoulder 8 upon the coupling collar 9.

In the Fig. 1 embodiment, said collar has a threaded socket 10 at one end to engage with the finely threaded pipe end 1. The other end of the coupling has a box coarsely threaded at 11 to engage with the thread 4 of the pipe end. Opposite the smooth tapered area 6 of the pipe, the box of the coupling has a complementary smooth socket to engage the pin end 12 of the pipe with a wedging fit.

Midway of the ends of the coupling is a cylindrical passage 13, adjacent which is the beveled shoulder 8 previously noted.

In the use of these tool joints, it will be understood that the coupling is secured in a comparatively permanent manner to the finely threaded end 1 of the drill stem section. The end 12 of an adjacent drill stem section is screwed into the box end of the coupling. This engagement is made every time the drill stem is removed from the hole and is thus adapted for frequent screwing up and unscrewing. The coarse thread 4 on the pipe engages within the thread 11 of the box and is screwed up tightly.

In this screwing up operation the unthreaded area 6 of the pipe wedges against the tapered inner box of the coupling and as the pipe is screwed tightly to a seat the movement of the pipe from the Fig. 1 position to the Fig. 2 position expands the box somewhat and also brings the end 7 of the pipe tightly into sealing contact with the shoulder 8.

As shown in Fig. 2, when desired, the coupling collar may be made with a coarsely threaded box at both ends, and the drill stem sections will then be made coarsely threaded at both ends. Where this is done, the disconnection at the joint may be made at either end of the coupling member as desired, and where wear occurs on one end, the other end may be used in uncoupling the drill stem section.

When the joint is thus made up the seal is preserved by the two sealing areas at 7 and at 6. The threads act simply to hold the end 12 of the pipe to the coupling. The expansion of the box of the coupling indicated at 14 in Fig. 2 exerts a tension upon the sealing area 6 which tends to preserve the seal and prevent leakage in use.

This type of one-piece tool joint is an economical construction and tends to prevent the leakage at the joints which is now a common difficulty in tool joints.

What I claim is:

1. A drill stem made up of pipe sections, each section having one end finely threaded and the other end formed with a uniform flat taper, a small portion of which adjacent the end is coarsely threaded, a coupling finely threaded at one end to engage the finely threaded end of said section, a tapered box in the other end of the coupling, the inner portion of said box for approximately one half its length being coarsely threaded, a tapered smooth area outside said threaded end being adapted to be engaged by said tapered pipe end and expanded thereby, and a beveled sealing end on said pipe section, cooperating with the inner end of said box.

2. A tool joint comprising a coupling member, an inwardly tapered box on one end, a sealing shoulder at the inner end of said box, a coarsely threaded area of sufficient length to furnish attachment to a pipe, the outer half of the box being unthreaded, a pipe section, a shoulder at the forward end thereof to engage said sealing shoulder, a short threaded area adjacent to said shoulder, and a smoothly tapered area to engage and wedge within said unthreaded area of said box as said threaded areas are screwed tightly together.

3. A tool joint comprising a coupling member, an inwardly tapered box on one end, a sealing shoulder at the inner end of said box, a coarsely threaded area of sufficient length to furnish attachment to a pipe, the outer half of the box being unthreaded, a pipe section, a shoulder at the forward end thereof to engage said sealing shoulder, a short threaded area adjacent to said shoulder, and a smoothly tapered area to engage and wedge within said unthreaded area of said box as said threaded areas are screwed tightly together, said smoothly tapered area on said pipe being of slightly larger diameter than said unthreaded area on the box so that it will serve to slightly expand said box when the pipe is screwed up.

4. A pipe joint including an external upset on the end of the pipe, a coarsely threaded area at said upset end, a short taper on the extremity of said pipe forming a shoulder, a smoothly tapered area on said pipe extending inwardly on the pipe from said threaded end approximately twice the length of the threaded portion, a coupling having a tapered box coarsely threaded adjacent the inner end thereof to engage the threaded area on said pipe, a beveled shoulder at said inner end to contact the pipe shoulder, and a smooth area including approximately the outer half of the inner surface of said box adapted to have a wedging fit with said smooth area on said pipe.

5. A pipe section having its ends externally upset, a beveled shoulder at the end of said section, a short coarsely threaded area adjacent said shoulder, the remainder of said upset end being smooth and unthreaded, a coupling member having an inwardly tapered box, a shoulder in said box to engage the pipe end, a coarsely threaded area at the inner end to engage the thread on said pipe, and a smooth area from the threaded area to the outer end of the box of slightly smaller diameter than the contacting area of said pipe whereby said box will be distended by said pipe end.

FLOYD L. SCOTT.